(12) United States Patent
Yoo (10) Patent No.: US 10,803,319 B2
(45) Date of Patent: Oct. 13, 2020

(54) ELECTRONIC DEVICE FOR CLASSIFYING VIDEO AND OPERATING METHOD THEREOF

(71) Applicant: Samsung Electronics Co., Ltd., Suwon-si, Gyeonggi-do (KR)

(72) Inventor: Jaehyeon Yoo, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 183 days.

(21) Appl. No.: 16/033,747

(22) Filed: Jul. 12, 2018

(65) Prior Publication Data

US 2019/0019036 A1 Jan. 17, 2019

(30) Foreign Application Priority Data

Jul. 13, 2017 (KR) .................. 10-2017-0089296

(51) Int. Cl.
*G06K 9/00* (2006.01)
*G06N 3/04* (2006.01)
(Continued)

(52) U.S. Cl.
CPC ..... *G06K 9/00718* (2013.01); *G06K 9/00744* (2013.01); *G06K 9/6267* (2013.01);
(Continued)

(58) Field of Classification Search
CPC ........... G06K 9/00718; G06K 9/00744; G06K 9/6267; G06N 3/0445; G06N 3/0472; G06N 3/08
See application file for complete search history.

(56) References Cited

U.S. PATENT DOCUMENTS

2006/0129395 A1  6/2006  Thiesson et al.
2016/0358072 A1  12/2016  Hermann et al.
(Continued)

FOREIGN PATENT DOCUMENTS

CN  105469065 A  4/2016
CN  106096568 A  11/2016
(Continued)

OTHER PUBLICATIONS

Jae Hyeon Yoo, Large-scale Video Classification guided by Batch Normalized LSTM Translator, Mobile Communications Business Samsung Electronics, Jul. 13, 2017.
(Continued)

*Primary Examiner* — Leon Flores
(74) *Attorney, Agent, or Firm* — Jefferson IP Law, LLP (57) ABSTRACT

An electronic device which trains a video classification model based on a neural network, and classifies a video based on the trained video classification model, and an operating method thereof is provided. The electronic device includes a memory and a processor functionally coupled with the memory, and the processor is configured to acquire label information corresponding to a video generate a representative frame representing the video, based on a plurality of frames included in the video extract a feature corresponding to the video by iteratively inputting the representative frame to a video classification model and train the video classification model based on the extracted feature.

12 Claims, 6 Drawing Sheets

(51) Int. Cl.
*G06N 3/08* (2006.01)
*G06K 9/62* (2006.01)

(52) U.S. Cl.
CPC ......... *G06N 3/0445* (2013.01); *G06N 3/0472* (2013.01); *G06N 3/08* (2013.01)

(56) References Cited

U.S. PATENT DOCUMENTS

| | | |
|---|---|---|
| 2017/0031654 A1 | 2/2017 | Zhang et al. |
| 2017/0076717 A1 | 3/2017 | Parada San Martin et al. |
| 2017/0124432 A1 | 5/2017 | Chen et al. |
| 2017/0154221 A1 | 6/2017 | Chen et al. |
| 2017/0344829 A1* | 11/2017 | Lan ...................... G06N 3/0445 |
| 2017/0364766 A1 | 12/2017 | Das et al. |
| 2018/0053057 A1* | 2/2018 | De Souza .......... G06K 9/00718 |

FOREIGN PATENT DOCUMENTS

| | | |
|---|---|---|
| CN | 106202054 A | 12/2016 |
| CN | 106250829 A | 12/2016 |
| WO | 2016/106383 A2 | 6/2016 |

OTHER PUBLICATIONS

Sami Abu-El-Haija et al., YouTube—8M: A Large-Scale Video Classification Benchmark, Sep. 27, 2016.
Kyunghyun Cho et al., Describing Multimedia Content using Attention-based Encoder-Decoder Networks, Jul. 4, 2015.
Jeff Donahue et al., Long-term Recurrent Convolutional Networks for Visual Recognition and Description, May 31, 2016.
Subhashini Venugopalan et al., Sequence to Sequence—Video to Text.
Subhashini Venugopalan et al., Translating Videos to Natural Language Using Deep Recurrent Neural Networks, Apr. 30, 2015.
Oriol Vinyals et al., Show and Tell: A Neural Image Caption Generator, Apr. 20, 2015.
C'esar Laurent et al., Batch Normalized Recurrent Neural Networks, Oct. 5, 2015.
Sergey Ioffe et al., Batch Normalization: Accelerating Deep Network Training by Reducing Internal Covariate Shift, Mar. 2, 2015.
Tim Cooijmans et al., Recurrent Batch Normalization, Feb. 28, 2017.
Basura Fernando et al., Learning End-to-end Video Classification with Rank-Pooling.

* cited by examiner

ELECTRONIC DEVICE FOR CLASSIFYING VIDEO AND OPERATING METHOD THEREOF

CROSS-REFERENCE TO RELATED APPLICATION(S)

This application is based on and claims priority under 35 U.S.C. § 119(a) of a Korean patent application number 10-2017-0089296, filed on Jul. 13, 2017, in the Korean Intellectual Property Office, the disclosure of which is incorporated by reference herein in its entirety.

BACKGROUND

1. Field

The disclosure relates to an electronic device which trains a video classification model based on a neural network, and classifies a video based on the trained video classification model, and an operating method thereof.

2. Description of Related Art

With the enhanced performance of portable electronic devices such as smart phones, and the development of wireless Internet services, there has been an explosive increase in video content which is created and consumed by various users.

In addition, video service providers may provide video content that is classified to a predetermined category to users, so that users can easily search video content.

In this case, as a method for classifying video content, various algorithms based on machine learning are utilized. For example, there have been researches on neural network which mathematically expresses and is modelled on characteristics of human biological neuron. The neural network can generate mapping between input patterns and output patterns, and based on this, the neural network may be expressed as having an ability to learn. The neural network has generalization performance which can generate a comparatively right output with respect to an input pattern which is not used for learning.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below.

According to a related-art method for classifying video content based on machine learning, each frame forming a video content is inputted into a trained model, and in the case of a video of a large size, a speed of a learning process may be reduced. Accordingly, a sufficient amount of data may not be learned within a limited time.

Another aspect of the disclosure is to provide an electronic device, which trains a video classification model by determining a representative frame of a video content, and iteratively inputting the representative frame into trained models corresponding to different time steps, and by iterating a learning algorithm as many times as the number of labels of the video by inputting an output label of a trained model corresponding to a previous time steps, and a right answer label with a predetermined probability, and an operating method thereof.

The technical objects to be achieved by the disclosure are not limited to the technical object mentioned above, and other technical objects that are not mentioned herein could be clearly understood by a person skilled in the art based on the following descriptions.

Additional aspects will be set forth in part in the description which follows and, in part, will be apparent from the description, or may be learned by practice of the presented embodiments.

In accordance with an aspect of the disclosure, an electronic device is provided. The electronic device includes a memory, and a processor functionally coupled with the memory. The processor is configured to acquire label information corresponding to a video generate a representative frame representing the video, based on a plurality of frames included in the video extract a feature corresponding to the video by iteratively inputting the representative frame to a video classification model and train the video classification model based on the extracted feature.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that a singular form of a noun corresponding to an item may include one or more of the things, unless the relevant context clearly indicates otherwise. As used herein, each of such phrases as "A or B" or "at least one of A and/or B" may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly or via another element (e.g., a third element).

The term "configured (or set) to . . . " used in the disclosure may be interchangeably used with the terms "suitable for . . . ," "having the capacity to . . . ," "adapted to . . . ," "made to . . . ," "capable of . . . ," or "designed to" in a hardware or software level depending on the situation. In a certain situation, the term "a device configured to . . . " may refer to "the device being capable of . . . " with another device or parts. For example, "a processor configured (set) to perform A, B, and C" may refer, for example, and without limitation, to a dedicated processor (for example, an embedded processor) for performing a corresponding operation, or a generic-purpose processor (for example, a central processing unit (CPU) or an application processor (AP)), or the like, for performing corresponding operations by executing one or more software programs stored in a memory device.

An electronic device according to various embodiments of the disclosure may include at least one of smartphones, tablet personal computers (PCs), mobile phones, video telephones, electronic book readers, desktop PCs, laptop PCs, netbook computers, workstations, servers, PDAs, portable multimedia players (PMPs), motion picture experts group (MPEG-1 or MPEG-2) Audio Layer 3 (MP3) players, medical devices, cameras, or wearable devices, or the like, but is not limited thereto. The wearable devices may include at least one of accessories (for example, watches, rings, bracelets, ankle bracelets, necklaces, glasses, contact lenses, head-mounted-devices (HMDs), etc.), fabric- or clothing-mounted devices (for example, electronic apparels), body-mounted devices (for example, skin pads, tattoos, etc.), bio-implantable circuits, or the like, but are not limited thereto. According to embodiments, the electronic devices may include at least one of, for example, televisions (TVs), digital video disk (DVD) players, audios, refrigerators, air conditioners, cleaners, ovens, microwave ovens, washing machines, air cleaners, set-top boxes, home automation control panels, security control panels, media boxes (for example, Samsung HomeSync™, Apple TV™, or Google TV™), game consoles (for example, Xbox™ and PlayStation™), electronic dictionaries, electronic keys, camcorders, electronic picture frames, or the like, but are not limited thereto.

According to another embodiment, the electronic devices may include at least one of medical devices (for example, various portable medical measurement devices (for example, a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, global navigation satellite systems (GNSS), event data recorders (EDRs), flight data recorders (FDRs), vehicle infotainment devices, electronic equipment for vessels (for example, navigation systems and gyrocompasses), avionics, security devices, head units for vehicles, industrial or home robots, drones, automatic teller's machines (ATMs) of financial institutions, points of sales (POSs) of stores, or internet of things (for example, light bulbs, various sensors, sprinkler devices, fire alarms, thermostats, street lamps, toasters, exercise equipment, hot water tanks, heaters, boilers, and the like), or the like, but are not limited thereto. According to an embodiment, the electronic devices may include at least one of furniture, a part of buildings/structures or cars, electronic boards, electronic signature receiving devices, projectors, or various measuring instruments (for example, water meters, electricity meters, gas meters, or wave meters, and the like), or the like, but are not limited thereto. The electronic devices according to various embodiments may be flexible or may be a combination of two or more devices of the above-mentioned devices. Also, electronic devices according to various embodiments of the disclosure are not limited to the above-mentioned devices. In the disclosure, the term "user" may refer to a person who uses the electronic device or a device that uses the electronic device (for example, an artificial intelligence electronic device).

Figure 1:
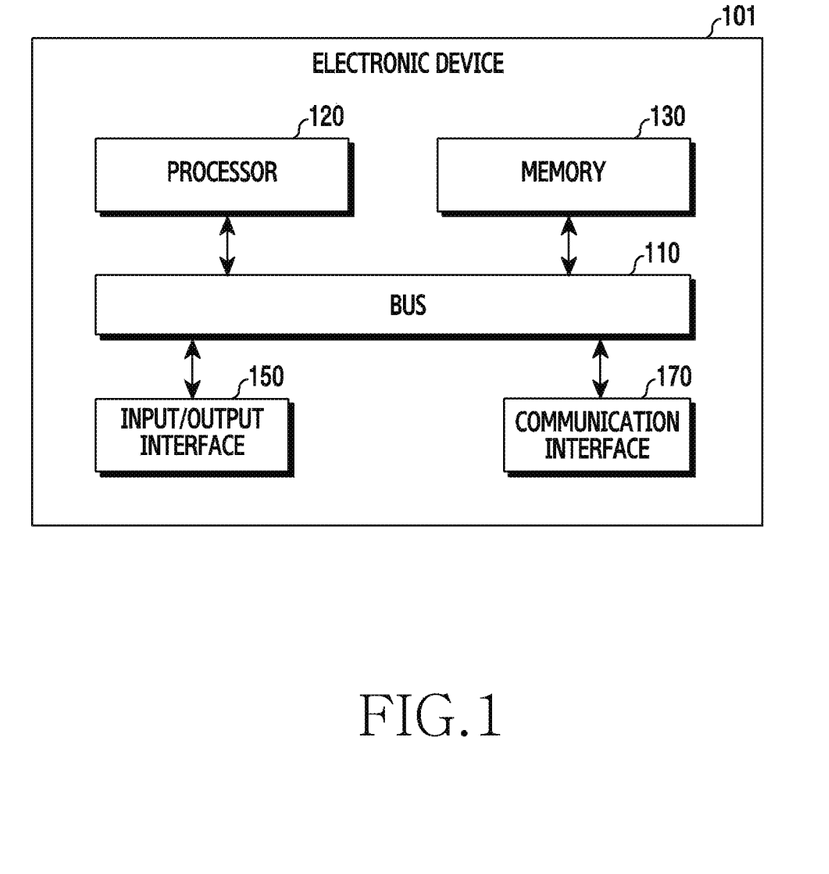
FIG. 1 is a block diagram illustrating an environment of a network according to various embodiments of the disclosure.

FIG. 1 is a block diagram illustrating an environment of a network according to various embodiments of the disclosure.

Referring to FIG. 1, there is illustrated an electronic device 101 in a network environment 100. The electronic device 101 may include a bus 110, a processor 120, a memory 130, an input/output interface 150, a display (not shown), and a communication interface 170. According to an embodiment, the electronic device 101 may not include at least one of the above-described elements or may further include other element(s). The bus 110 may interconnect the above-described elements 110-170 and may include a circuit for transmitting communications (for example, a control message or data) among the above-described elements. The processor 120 may include one or more of a CPU, an AP, or a communication processor (CP), or the like. The processor 120 may perform, for example, an operation or data processing associated with control and/or communication of at least one other element(s) of the electronic device 101.

The memory 130 may include a volatile memory and/or nonvolatile memory. The memory 130 may store commands or data associated with at least one other element(s) of the electronic device 101. A middleware 143 may perform a mediation role such that an API 145 or an application program 147 communicates with a kernel 141 to exchange data.

The input/output interface 150 may transmit a command or data, input from a user or another external device, to other element(s) of the electronic device 101, or may output a command or data, received from other element(s) of the electronic device 101, to a user or another external device.

Wireless communication may include cellular communication using at least one of, for example, long-term evolution (LTE), LTE Advanced (LTE-A), code division multiple access (CDMA), wideband CDMA (WCDMA), universal mobile telecommunications system (UNITS), wireless broadband (WiBro), global system for mobile communications (GSM), or the like. According to an embodiment, as indicated by reference numeral 164 in FIG. 1, the wireless communication may include at least one of Wi-Fi, light fidelity (LiFi), Bluetooth, Bluetooth low energy (BLE), Zigbee, near field communication (NFC), magnetic secure transmission, radio frequency (RF), or a body area network (BAN). Wired communication may include at least one of, for example, a universal serial bus (USB), a high-definition multimedia interface (HDMI), a recommended standard-232 (RS-232), power line communication, or a plain old telephone service (POTS). A network 162 may include at least one of telecommunications networks, for example, a computer network (for example, local area network (LAN) or wide area network (WAN)), Internet, or a telephone network.

Figure 2:
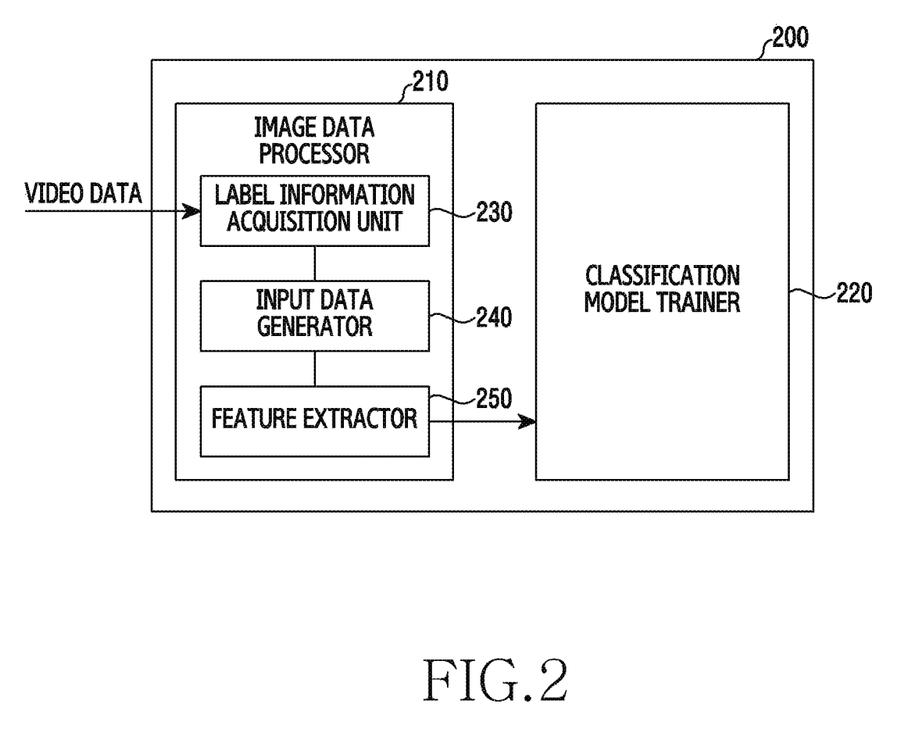
FIG. 2 is a block diagram illustrating a processor according to various embodiments of the disclosure.

FIG. 2 is a block diagram illustrating a processor according to various embodiments of the disclosure.

Referring to FIG. 2, the processor 200 may include an entirety or a portion of the processor 120 illustrated in FIG. 1. According to an embodiment, the processor 200 may be configured to receive training data for training a video classification model, to extract a feature of the training data based on label information of the received training data, and to train the video classification model based on the extracted feature. In an embodiment, the training data may be video data. In an embodiment, the training data may be video data which has been already classified. In an embodiment, the video data which has been already classified may be video data which has been labeled. In an embodiment, the label may be one or more categories or attributes that are determined according to at least one of a content (subject or genre) or a format of the video data. In an embodiment, the label may be one or more categories or attributes corresponding to one video. For example, the label may be one or more categories or attributes related to a subject of the video, such as game, sports, travel, or science, or may be one or more categories or attributes related to a content or format of the video, such as documentary, entertainment, or broadcasting. In an embodiment, one or more labels may be assigned sequences based on a weight and a meaning of each label in the video.

The processor 200 may include an image data processor 210 and a classification model trainer 220.

The image data processor 210 may receive image data for training the video classification model, and may transform or process the received image data into data appropriate for training the video classification model.

The image data processor 210 may include a label information acquisition unit 230, an input data generator 240, and a feature extractor 250.

The label information acquisition unit 230 may acquire label information corresponding to the received video data. In an embodiment, the label information may correspond to the received video data, and may be information regarding one or more categories or attributes determined according to at least one of a content or format of the received video data. In an embodiment, the label information may be stored with information regarding the video corresponding to the label information. The label information may be stored in at least one of the memory 130 or a database of an external device.

The input data generator 240 may generate input data to be inputted to the video classification model included in a neural network. In an embodiment, the video classification model included in the neural network may be a video classification model based on a recurrent neural network or a long short term memory (LSTM). In the following description, the video classification model included in the neural network will be referred to as an LSTM model. In an embodiment, the input data to be inputted to the LSTM model may be used for the video classification model to classify the received video. That is, the input data may be used for the video classification model to determine the attribute or category of the received video.

The input data generator 240 may generate the input data to be inputted to the LSTM model included in the neural network, based on the received video data and the label information. In an embodiment, the input data generator 240 may generate the input data to be inputted to the LSTM model, based on a plurality of frame data included in the received video data. Herein, the frame data may refer to each frame forming the video, RGB data of each frame forming the video, data extracting a feature of each frame (for example, a feature point of each frame), or data representing the feature of each frame as a vector.

In an embodiment, the input data generator 240 may generate the input data to be inputted to the LSTM model, based on one or more frame data selected from the plurality of frame data included in the received video data. The number of the selected one or more frame data may be related to the number of labels of the received video data. For example, the number of the selected one or more frame data may be the number of labels of the received video data. When the number of labels of the received video data is three (for example, sports, broadcasting, and documentary), the input data generator 240 may generate the input data to be inputted to the LSTM model, based on three frame data from among the plurality of frame data.

The input data generator 240 may select one or more frame data by sampling the plurality of frame data included in the received video data at regular intervals, and may generate the input data to be inputted to the LSTM model, based on the selected one or more frame data. In addition, the input data generator 240 may randomly select one or more frame data from among the plurality of frame data. In addition, the input data generator 240 may select one or more frame data that include the largest number of pieces of feature information from among the plurality of frame data.

In another example, the input data generator 240 may determine, as the input data to be inputted to the LSTM model, a mean frame averaging the plurality of frame data included in the received video data.

In still another example, the input data generator 240 may determine the input data to be inputted to the LSTM model by applying both selection and averaging. The input data generator 240 may determine, as the input data to be inputted to the LSTM model, a mean frame averaging one or more frame data selected from the plurality of frame data.

The feature extractor 250 may extract a feature vector corresponding to the received video data by inputting the input data to the LSTM model. The feature vector corresponding to the received video data may be a representation of information regarding the label (or attribute or category) of the received video data, which is determined by the video classification model, as a vector. For example, when the real labels (right answer label) of the received video data are sports and documentary, and the labels of the video data determined by the video classification model are science and documentary, the feature vector may be a representation of information regarding science and documentary as a vector. In an embodiment, the feature vector may be an integration of vectors corresponding to information of the respective labels. For example, when the feature vector corresponding to science is (1, 0, 0) and the feature vector corresponding to documentary is (0, 1, 0), the feature vector extracted by the feature extractor may be (1, 0, 0, 0, 1, 0).

In an embodiment, the feature extractor 250 may extract the feature vector corresponding to the received video data by iteratively using or performing the LSTM model. Using the LSTM model may refer to a series of processes of inputting data to the LSTM model and outputting corresponding data. In addition, iteratively using the LSTM model may refer to using the LSTM model with respect to different times (or according different times or in a time-sequential configuration). The LSTM models regarding different times may be referred to as LSTM sub models. For example, iteratively using the LSTM model three times may refer to using an LSTM sub model corresponding to t=1, using an LSTM sub model corresponding to t=2, and using an LSTM sub model corresponding to t=3.

In an embodiment, the number of times the feature extractor 250 iteratively uses or performs the LSTM model may be the number of labels corresponding to the received video data. For example, when the number of labels corresponding to the received video data is three, the feature extractor 250 may extract the feature vector by iteratively using the LSTM models three times.

The classification model trainer 220 may determine an error of the video classification model by comparing the feature vector extracted by the feature extractor 250 and the used label information of the video data. For example, when the labels corresponding to the feature vector extracted by the feature extractor 250 are science and documentary, and the real label information of the video data is sports and documentary, the classification model trainer 220 may update a coefficient or a connection weight used in the LSTM model so as to reduce an occurring error.

Figure 3:
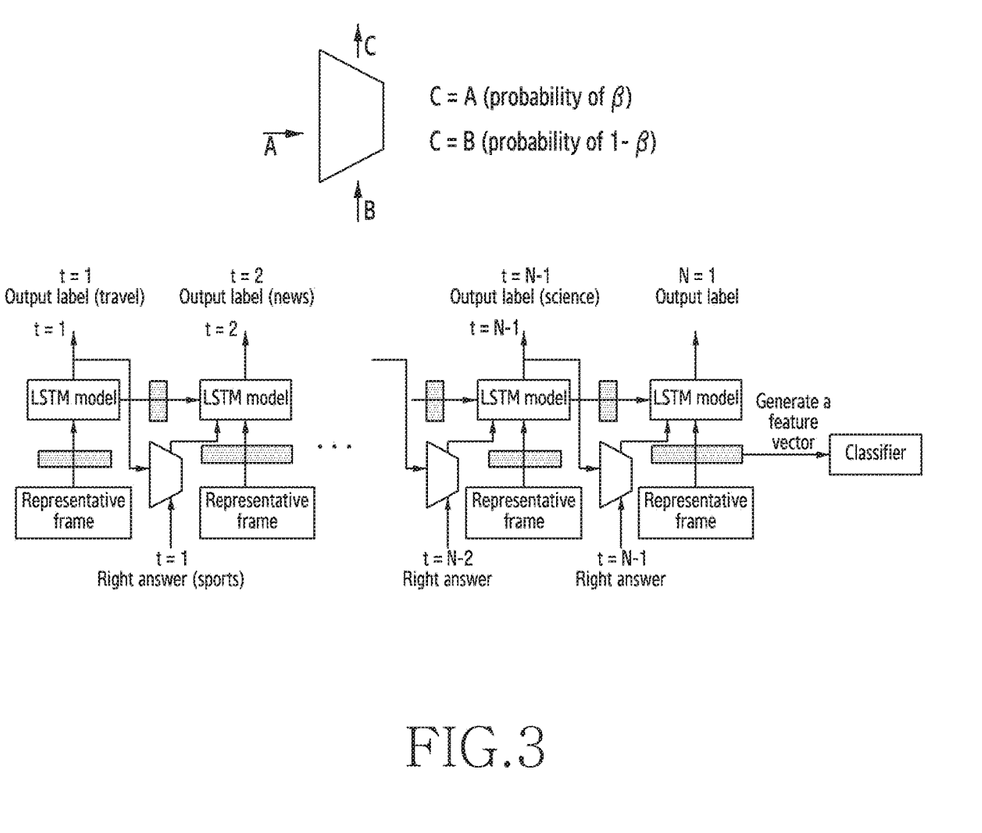
FIG. 3 is a view illustrating an operating process of a feature extractor according to various embodiments of the disclosure.

FIG. 3 is a view illustrating an operating process of the feature extractor according to various embodiments of the disclosure.

Referring to FIG. 3, the feature extractor 250 may include an LSTM model. The LSTM model may be a model that receives an input of input data and/or output data of a previous time with respect to a specific time (for example, t=2), and outputs data regarding the specific time. In this case, the output data regarding the specific time may be data regarding a label corresponding to the input data. In addition, the output data (e.g., label) regarding the specific time may be related to a sequence. For example, an output label regarding t=1 may be a label that has the highest correlation with the input data. In addition, an output label regarding t=2 may be a label that has the second highest correlation with the input data.

The input data inputted to the feature extractor 250 may be data that represents the content of the received video data (that is, data for training the video classification model). That is, the input data may be data including feature information of all frames of the received video data, or may be data including feature information of frames selected from the received video data.

Batch normalization (BN) may be applied to the LSTM structure of the feature extractor 250. BN may refer to normalizing a distribution of input data inputted to each LSTM model. For example, the processor 120 may normalize a distribution of input data inputted to the LSTM model to input data having a mean of 0 and a standard deviation of 1. Referring to FIG. 3, it can be seen that BN is applied to the input data before the input data is inputted to the LSTM model. In addition, BN may be applied in transition from the LSTM model corresponding to a previous time step (for example, t=1) to the LSTM model (for example, t=2) corresponding to a next time step. This may refer to a process of normalizing one or more parameter values that have been used in the LSTM model corresponding to the previous time step (for example, t=1).

However, BN may not be applied to the feature vector extracted by the feature extractor 250. The feature vector extracted by the feature extractor may be provided to the classification model trainer 220 without undergoing BN. When BN is applied to the feature vector extracted by the feature extractor, an error rate of the video classification model may increase. Therefore, the feature vector extracted by the feature extractor may be provided to the classification model trainer 220 without undergoing BN.

The LSTM structure of the feature extractor 250 may apply a stochastic gating mechanism (SGM). When learning is performed with the LSTM structure to which BN is applied, an overfitting phenomenon may occur, and the SGM may be applied to the LSTM structure of the feature extractor 250 to prevent the overfitting phenomenon. Specifically, the LSTM may be a kind of recurrent neural network, and may use an output corresponding to a previous time as an input corresponding to a next time (LSTM feedback loop). In this case, when learning is performed by inputting a real label (a right answer label, a ground truth label) of a received video, the learning may achieve accuracy of 100%, but real performance may be degraded. That is, when a video that is not exactly classified is received, a label determined by the video classification model may be frequently different from a real label.

The SGM refers to a mechanism that stochastically determines whether an LSTM feedback loop is based on an output value of the LSTM model or a right answer (ground truth label). When the SGM is applied to the LSTM structure to which BN is applied, performance is higher than when learning is performed by inputting a real label. An error rate in classification of an unclassified video may therefore be reduced.

Figure 4:
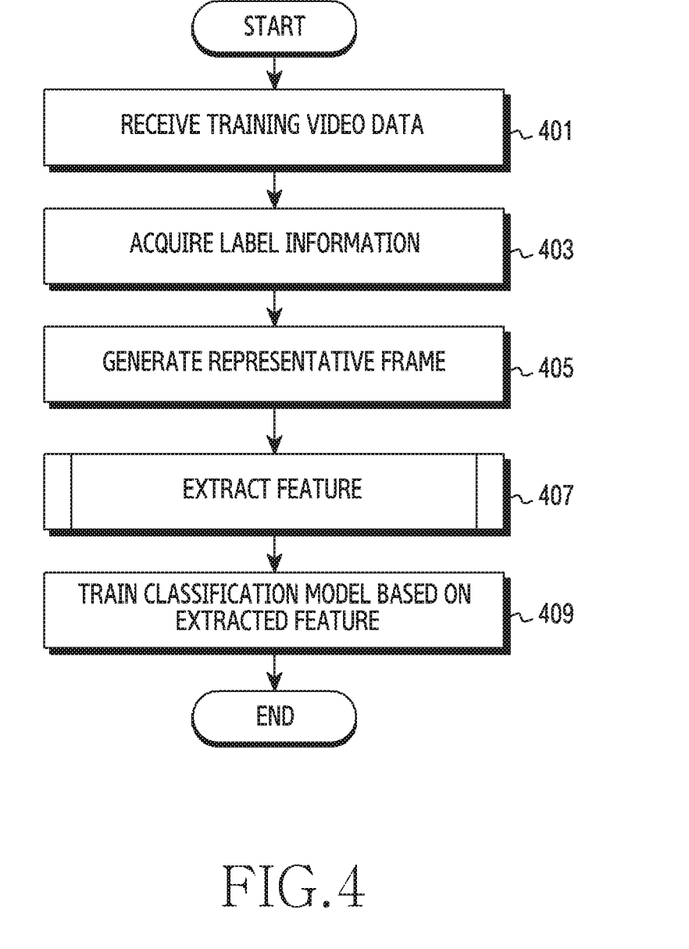
FIG. 4 is a view illustrating a training process of a video classification model according to various embodiments disclosure.

FIG. 4 is a view illustrating a training process of a video classification model according to various embodiments of the disclosure.

Referring to FIG. 4, in operation 401 the processor 120 may receive training video data. In an embodiment, the training video data may be video data that has been already classified.

In operation 403, the processor 120 may acquire label information of the received training video data. In an embodiment, the label information may be one or more categories or attributes corresponding to the received training video data.

In operation 405, the processor 120 may generate a representative frame (or input data) of the received training video data. The input data may refer to data to be inputted to a video classification model (or an LSTM model) included in a neural network. The representative frame (input data) may be generated based on a frame selected from a plurality of frames included in the received training video data or a mean frame. Although not shown, the representative frame may not be generated in operation 405 and all frames of the received training video data may be utilized as input data to be inputted to the LSTM model.

In operation 407, the processor 120 may extract a feature of the received training video data. The feature of the received training video data may be a feature vector corresponding to the received training video data, and the feature vector may be a representation of information regarding a label (or attribute or category) of the video data, which is determined by the video classification model, as a vector.

In operation 409, the processor 120 may train the classification model based on the extracted feature. In an embodiment, the processor 120 may determine an error of the video classification model by comparing the feature vector extracted by the feature extractor 250 and the used label information of the video data, and may update a coefficient or a connection weight used in the LSTM model so as to reduce the determined error.

Figure 5:
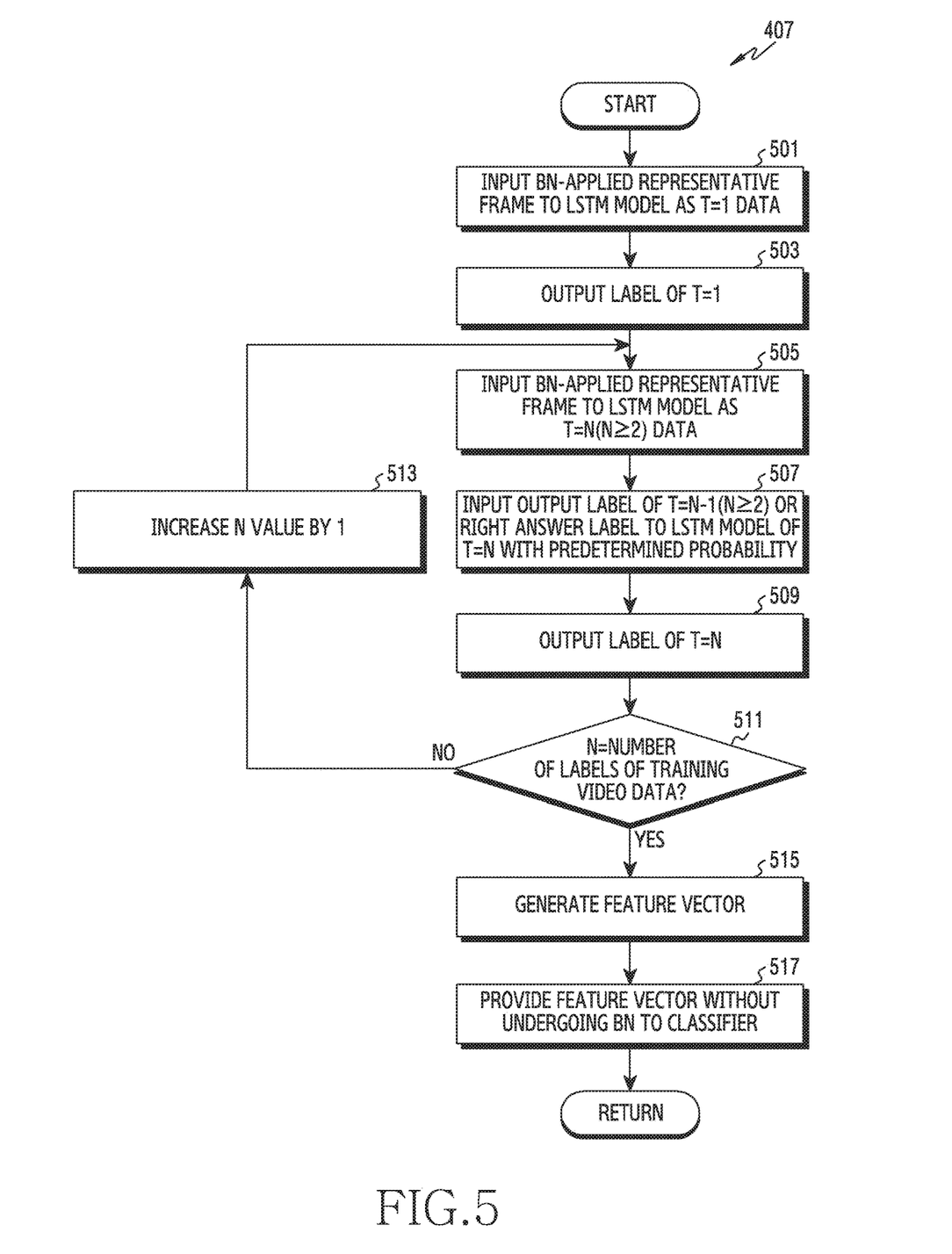
FIG. 5 is a view illustrating a training process of a video classification model according to various embodiments of the disclosure.

FIG. 5 is a view illustrating a training process of the video classification model according to various embodiments of the disclosure. FIG. 5 is a view illustrating operation 407 of FIG. 4 in detail.

Referring to FIG. 5, in operation 501, the processor 120 may apply BN to the representative frame, and may input the representative frame to which BN is applied to the LSTM model as t=1 data. In an embodiment, the representative frame may be input data to be inputted to the LSTM model corresponding to t=1. Although not shown, the representative frame may be input data to be equally inputted to the LSTM models corresponding to all times (t=1 to t=N).

In operation 503, the processor 120 may output a label of the LSTM model corresponding to t=1. Referring to FIG. 3, the processor 120 may output the label of the LSTM model corresponding to t=1 as "travel."

In operation 505, the processor 120 may input the representative frame to which BN is applied to the LSTM model as t=N (N≥2) data. For example, the representative frame to which BN is applied may be inputted to the LSTM model corresponding to t=2. In this case, the representative frame inputted to the LSTM model corresponding to t=2 may be the same as the representative frame inputted to the LSTM model corresponding to t=1, and this may be equally applied from t=1 to t=S. Herein, S may be the number of labels of the training video data.

In operation 507, the processor 120 may input an output label of t=N−1(N≥2) or a right answer label of t=N−1 to the LSTM model corresponding to t=N with a predetermined probability p. For example, if N=2, the processor 120 may input an output label ("travel") of t=1 or a right answer label ("sports") of t=1 to the LSTM model corresponding to t=2 with the predetermined probability p. Specifically, the processor 120 may input "travel" according to the probability of p or may input "sports" according to the probability of 1-p.

In operation 509, the processor 120 may output the label of the LSTM model corresponding to t=N. For example, if N=2, the processor 120 may output a label ("news") of the LSTM model corresponding to t=2.

In operation 511, the processor 120 may compare the N value and the number of labels of the received training video data. That is, in an embodiment of the disclosure, since the LSTM model is iteratively used as many times as the number of labels of the training video data, the processor 120 may compare the number of times N of iterating the current LSTM model and the number of labels of the received training video data.

When the N value is not equal to the number of labels of the training video data, the N value may be increased by 1 in operation 513 and operations 505 and 509 may be iteratively performed.

In operation 515, when the N value is equal to the number of labels of the training video data, the processor 120 may determine that the LSTM model is iterated as many times as the number of labels of the received training video data, and may generate the feature vector based on data outputted from the LSTM models corresponding to respective times.

In operation 517, the processor 120 may provide the feature vector without undergoing BN to a classifier (or the classification model trainer 220). Although not shown, the classification model trainer 220 may compare the generated feature vector and the right answer label of the received training video data, and may update a coefficient or a connection weight used in the LSTM model so as to reduce an error therebetween.

Figure 6:
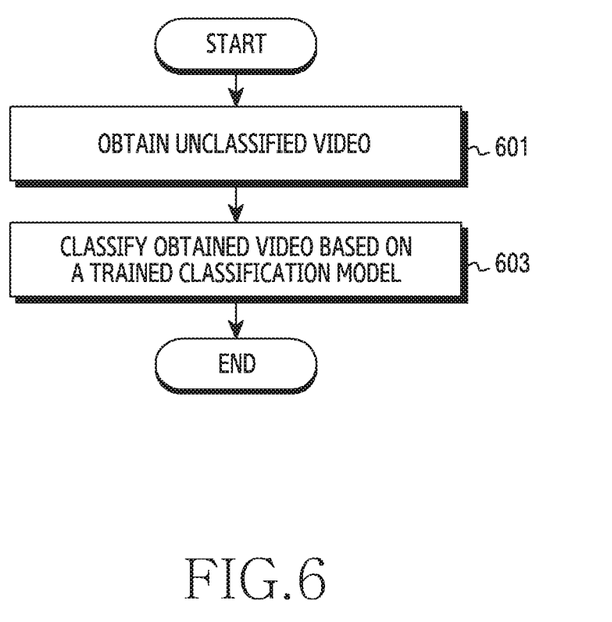
FIG. 6 is a view illustrating a classification process of a video classification model according to various embodiments of the disclosure.

FIG. 6 is a view illustrating a classifying process of a video classification model according to various embodiments of the disclosure.

Referring to FIG. 6, in operation 601 the processor 120 may obtain an unclassified video. In an embodiment, the unclassified video may indicate a video the label of which is not determined.

In operation 603, the processor 120 may classify the obtained video based on a trained classification model. In an embodiment, the operation of classifying the obtained video may include an operation of labeling the obtained video with one or more labels. In an embodiment, the trained classification model may be a video classification model that is trained to reduce an error by iteratively using the LSTM model to which BN and SGM are applied as many times as the number of labels of the video.

In addition, embodiments disclosed in the detailed description and the drawings are only suggested to easily explain the disclosure and to assist in understanding the disclosure, and are not intended to limit the scope of the disclosure. Therefore, the scope of the disclosure is defined not by the detailed description of the disclosure but by the appended claims, and all changes or differences derived based on the technical idea of the disclosure should be construed as being included in the scope of the disclosure.

An electronic device for classifying a video and an operating method thereof according to various embodiments can train a video a small number of times of iterating an algorithm, and can reduce time required to train for machine learning. Accordingly, since a sufficient amount of data can be learned within a limited time, an error rate of video classification can be reduced.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device for classifying a video, the electronic device comprising:
a memory; and
a processor functionally coupled with the memory,
wherein the processor is configured to:
acquire information on one or more labels corresponding to a video,
generate a representative frame representing the video, based on a plurality of frames included in the video, extract a feature corresponding to the video by iteratively inputting the representative frame to a video classification model, and train the video classification model based on the extracted feature, wherein the video classification model comprises sub models which are distinguished from one another to correspond to different times, and wherein an output label of a sub model corresponding to a current time and a right answer label of the sub model corresponding to the current time are inputted to a sub model corresponding to a next time with a predetermined probability.

2. The electronic device of claim 1,
wherein the video classification model is a long short term memory (LSTM) model, and
wherein the sub model is an LSTM sub model.

3. The electronic device of claim 2, wherein data applying batch normalization (BN) to the representative frame is inputted to the LSTM model.

4. The electronic device of claim 2, wherein a number of the LSTM sub models is a number of the one or more labels corresponding to the video.

5. The electronic device of claim 1, wherein the representative frame is a frame that comprises feature information of at least one frame of the video.

6. The electronic device of claim 1,
wherein a feature vector corresponding to the extracted feature is provided to the video classification model, and
wherein the feature vector refrains from undergoing batch normalization (BN) before being provided to the video classification model.

7. An operating method of an electronic device, the operating method comprising:
acquiring information on one or more labels corresponding to a video;
generating a representative frame representing the video, based on a plurality of frames included in the video;
extracting a feature corresponding to the video by iteratively inputting the representative frame to a video classification model; and
training the video classification model based on the extracted feature,
wherein the video classification model comprises sub models which are distinguished from one another to correspond to different times, and
wherein the operating method further comprises inputting an output label of a sub model corresponding to a current time and a right answer label of the sub model corresponding to the current time to a sub model corresponding to a next time with a predetermined probability.

8. The operating method of claim 7,
wherein the video classification model is a long short term memory (LSTM) model, and
wherein the sub model is an LSTM sub model.

9. The operating method of claim 8, wherein the inputting of the representative frame to the video classification model comprises inputting data applying batch normalization (BN) to the representative frame to the LSTM model.

10. The operating method of claim 8, wherein a number of the LSTM sub models is a number of the one or more labels corresponding to the video.

11. The operating method of claim 7, wherein the representative frame is a frame that comprises feature information of at least one frame of the video.

12. The operating method of claim 7,
wherein the training of the video classification model based on the extracted feature comprises providing a feature vector corresponding to the extracted feature to the video classification model, and
wherein the feature vector refrains from undergoing batch normalization (BN) before being provided to the video classification model.

* * * * *